(12) United States Patent
Sakakibara (10) Patent No.: US 12,486,773 B2
(45) Date of Patent: Dec. 2, 2025

(54) RADIAL TURBINE IMPELLER

(71) Applicant: HONDA MOTOR CO., LTD., Tokyo (JP)

(72) Inventor: Takashi Sakakibara, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 54 days.

(21) Appl. No.: 18/531,970

(22) Filed: Dec. 7, 2023

(65) Prior Publication Data

US 2024/0271533 A1 Aug. 15, 2024

(30) Foreign Application Priority Data

Feb. 13, 2023 (JP) .................................. 2023-020101

(51) Int. Cl.
*F01D 5/14* (2006.01)
*F01D 5/04* (2006.01)

(52) U.S. Cl.
CPC .............. *F01D 5/143* (2013.01); *F01D 5/048* (2013.01); *F05D 2240/301* (2013.01); *F05D 2240/304* (2013.01)

(58) Field of Classification Search
CPC .... F01D 5/143; F01D 5/048; F05D 2240/301; F05D 2240/304; F05D 2250/711; F05D 2240/24; F05D 2220/40
See application file for complete search history.

(56) References Cited

U.S. PATENT DOCUMENTS

| | | | |
|---|---|---|---|
| 9,988,907 B2* | 6/2018 | Xu | F01D 5/141 |
| 9,988,909 B2* | 6/2018 | Xu | F01D 5/143 |
| 2007/0134086 A1* | 6/2007 | Higashimori | F04D 29/681 |
| | | | 415/208.3 |
| 2015/0086395 A1* | 3/2015 | Dextraze | F04D 17/10 |
| | | | 416/192 |
| 2023/0175406 A1* | 6/2023 | Mohamed | F01D 5/141 |
| 2023/0258197 A1* | 8/2023 | Iwakiri | F04D 29/441 |
| | | | 415/203 |

FOREIGN PATENT DOCUMENTS

JP 2011117344 A 6/2011

* cited by examiner

*Primary Examiner* — Courtney D Heinle
*Assistant Examiner* — Andrew Thanh Bui
(74) *Attorney, Agent, or Firm* — Armstrong Teasdale LLP

(57) ABSTRACT

A radial turbine impeller includes a hub having a substantially conical shape and multiple turbine blades provided on an outer peripheral surface of the hub at intervals in a rotational direction. In a meridian cross section, a hub line formed by the outer peripheral surface of the hub has a diameter that monotonically decreases from an upstream end on a radially outer side to a downstream end on a radially inner side, and includes a convex part that is convex toward a radially outer side.

5 Claims, 8 Drawing Sheets

RADIAL TURBINE IMPELLER

TECHNICAL FIELD

The present invention relates to a radial turbine impeller used for supercharging of an internal combustion engine or the like.

BACKGROUND ART

In a radial turbine used in a turbine machine, which typically is a gas turbine engine, a compressed fluid, such as a compressed high-temperature gas, is supplied to a turbine impeller from a turbine nozzle defined by stator blades (vanes). The compressed fluid expands in volume and the flow velocity thereof increases when passing the turbine nozzle, whereby the compressed fluid supplied to the turbine impeller rotates the turbine impeller at a high speed. To make the turbine impeller produce more work, it is necessary not only to increase the expansion ratio of the turbine but also to cause a greater amount of compressed fluid to flow between the turbine blades of the turbine impeller.

On the other hand, if a large amount of high-temperature combustion gas is supplied to the turbine impeller, the load on each turbine blade becomes large, and thus, it is required for the turbine blade to have a sufficient strength. As one way to achieve this, the thickness of each turbine blade may be increased to ensure a sufficient strength of the turbine blade. Also, by increasing the number of the number of turbine blades and/or by increasing the height of each turbine blade, it is possible to enhance the adiabatic efficiency of the turbine (hereinafter, may be simply referred to as "the efficiency"). However, if the number of turbine blades is simply increased and/or the thickness of each turbine blade is simply increased, the area of the narrowest part (throat) between the turbine blades near the outlet becomes small, and thus, it may become impossible for the fluid to flow with a necessary flow rate and the efficiency may be lowered.

Also, generally, the temperature of the turbine blades of the radial turbine becomes high, and in addition, the blade height is higher at the outlet than at the inlet. Therefore, in order to enhance the support stiffness of the turbine blades, the thickness of the base portion (the portion near the root) of the turbine blade (the hub-side blade thickness) is set to be large, or the radius of curvature of a fillet (curved surface) that connects the side surface of the turbine blade and the hub surface (the outer peripheral surface of the hub) is set to be large. However, with such a setting, the fillets adjacent to each other in the rotational direction interfere (overlap) with each other, and thus, it is difficult to simply increase the number of turbine blades.

To solve such a problem, there is proposed a radial turbine impeller provided with two types of turbine blades, namely, first turbine blades (long blades or full blades) and second turbine blades (short blades or splitter blades), which have mutually different lengths from the leading edge to the trailing edge in the axial direction (JP2011-117344A). In this radial turbine impeller, in the leading edge part (inlet side) where the load is large, a short blade is disposed between each two adjacent ones of the long blades so that the number of blades is increased and the load on each blade is reduced. On the other hand, in the trailing edge part (outlet side) where the load is small, the short blades extend short of the throat position of the long blades in the axial direction, whereby the area of the throat near the outlet, which determines the maximum flow rate, is ensured. Consequently, compared to the configuration in which the impeller has only the long blades, the number of blades on the inlet side can be increased, and the tradeoff between the efficiency and the maximum flow rate can be reduced.

In the above conventional technology, in a trailing edge part of the long blades where the short blades are absent, the fillets of each adjacent long blades do not overlap each other. However, in the part where the short blades are present, the distance between each long blade and the short blade adjacent thereto is small, and the fillets of them are also close to each other, and thus, fillets with an appropriate radius of curvature cannot be formed. To form fillets with an appropriate radius of curvature while increasing the number of turbine blades, it is necessary to limit the length of the short blades. Therefore, even though the number of turbine blades is increased, it is difficult to improve the efficiency. To address this problem, it may be conceived to raise a part of the hub surface (the outer peripheral surface of the hub) corresponding to the downstream part of the turbine blades (to enlarge the radius of the part of the hub corresponding to the downstream part), but this would reduce the throat area near the outlet of the turbine, and thus, it would be also difficult to improve the efficiency.

SUMMARY OF THE INVENTION

In view of the foregoing background, a primary object of the present invention is to provide a radial turbine impeller capable of enhancing the adiabatic efficiency while ensuring the support stiffness of the turbine blades, thereby contributing to energy efficiency.

To achieve the above object, one aspect of the present invention provides a radial turbine impeller (58) comprising a hub (64) having a substantially conical shape and multiple turbine blades (68) provided on an outer peripheral surface of the hub (64) at intervals in a rotational direction, wherein in a meridian cross section, a hub line (78) formed by the outer peripheral surface of the hub has a diameter that monotonically decreases from an upstream end (78a) on a radially outer side to a downstream end (78b) on a radially inner side (over an entire section), and includes a convex (80) part that is convex toward a radially outer side. Here, the meridian cross section shows the shape of the turbine blade by rotationally projecting the turbine blade about the rotation axis of the radial turbine impeller on a cross section along the rotation axis.

According to this aspect, since the hub line includes a convex part that is convex toward the radially outer side, compared to the case where the convex part is not provided, the diameter of the hub line at the convex part is increased, and the inter-blade distance at the convex part is increased. Therefore, it is possible to form fillets with an appropriate radius of curvature, to thereby ensure the support stiffness of the turbine blades. Also, in a downstream part of the convex part as well as a part downstream of the convex part, an increase in the diameter of the hub line is avoided, and thus, the throat area near the outlet of the radial turbine impeller is not reduced. Therefore, it is possible to increase the number of blades while ensuring the maximum flow rate which depends on the throat area, and to suppress lowering of the efficiency.

Preferably, a position (PL) of the convex part (80) on the hub line (78) in the meridian cross section is located downstream of the upstream end (78a) by more than 50% of an entire length of the hub line.

According to this aspect, in the downstream portion where the diameter of the hub is smaller than in the upstream portion and hence the passage width on the outer peripheral surface of the hub is narrower than in the upstream portion, the narrowing of the passage width can be alleviated. Therefore, it is possible to ensure the support stiffness of each turbine blade in the downstream portion while improving the efficiency by increasing the number of blades.

Preferably, provided that in the meridian cross section, a direction directed toward the downstream end (78b) in an axial direction of the radial turbine impeller (58) is represented as 0°, and a radial direction of the hub directed from the upstream end (78a) toward an inner side is represented as −90°, an inclination angle (TS) of a tangent line of the hub line (78) has at least one extremum (θ2, θ3) on a side downstream of the upstream end by more than 50% of the entire length of the hub line.

According to this aspect, the start position of the convex part is located downstream of the upstream end 78a by more than 50% of the entire length of the hub line. Thus, the entirety of the convex part is positioned downstream of the upstream end 78a by more than 50% of the entire length of the hub line. This can reliably ensure the support stiffness of the turbine blades and improve the efficiency.

Preferably, the at least one extremum consists of one local maximum (θ2) and one local minimum (θ3), and an angle difference (Δθ1) obtained by subtracting the local minimum (θ3) of the inclination angle from the local maximum (θ2) of the inclination angle is greater than 0° and less than 25°.

According to this aspect, since the difference between the inclination angle at the start position of the convex part and the inclination angle at the end position of the convex part is less than 25°, the convex part is prevented from becoming a resistance against the fluid flowing between the turbine blades.

Preferably, in the case where the at least one extremum consists of one local maximum (θ2) and one local minimum (θ3), an angle difference (Δθ2) obtained by subtracting the local minimum (θ3) of the inclination angle from the inclination angle (θ1) at the downstream end (78b) is greater than 0° and less than 25°.

According to this aspect, the end position of the convex part is located in radially inner position having an inclination angle close to the inclination angle at the downstream end. Thus, the diameter of the radially inner part of the hub line where the convex part is provided becomes large, and the inter-blade distance in the radially inner part becomes large.

Preferably, the at least one extremum consists of one local maximum (θ2), and an angle difference (Δθ3) obtained by subtracting the inclination angle (θ1) at the downstream end (78b) from the local maximum (θ2) of the inclination angle is greater than 0° and less than 25°.

According to this aspect, the start position of the convex part is located in a radially inner position having an inclination angle close to the inclination angle at the downstream end. Thus, the diameter of the radially inner part of the hub line where the convex part is provided becomes large, and the inter-blade distance in the radially inner part becomes large.

Preferably, the turbine blades (68) include multiple long blades (68A) and multiple short blades (68B) disposed alternately in a circumferential direction, each long blade having a trailing edge (72) in a predetermined position in an axial direction of the radial turbine impeller (58), and each short blade having a trailing edge positioned on a side of the predetermined position closer to the upstream end (78a).

According to this aspect, since the turbine blades include the short blades, the area of the throat formed near the trailing edges of the long blades disposed on either side of each short blade in the circumferential direction becomes large. Therefore, it is possible to increase the number of blades while ensuring the maximum flow rate, and to suppress lowering of the efficiency.

According to the foregoing aspect, it is possible to provide a radial turbine capable of enhancing the adiabatic efficiency by increasing the number of blades while ensuring the support stiffness of the turbine blades by forming fillets with an appropriate radius of curvature.

DETAILED DESCRIPTION OF THE INVENTION

In the following, embodiments of the present invention will be described with reference to the drawings.

First Embodiment

Figure 1:
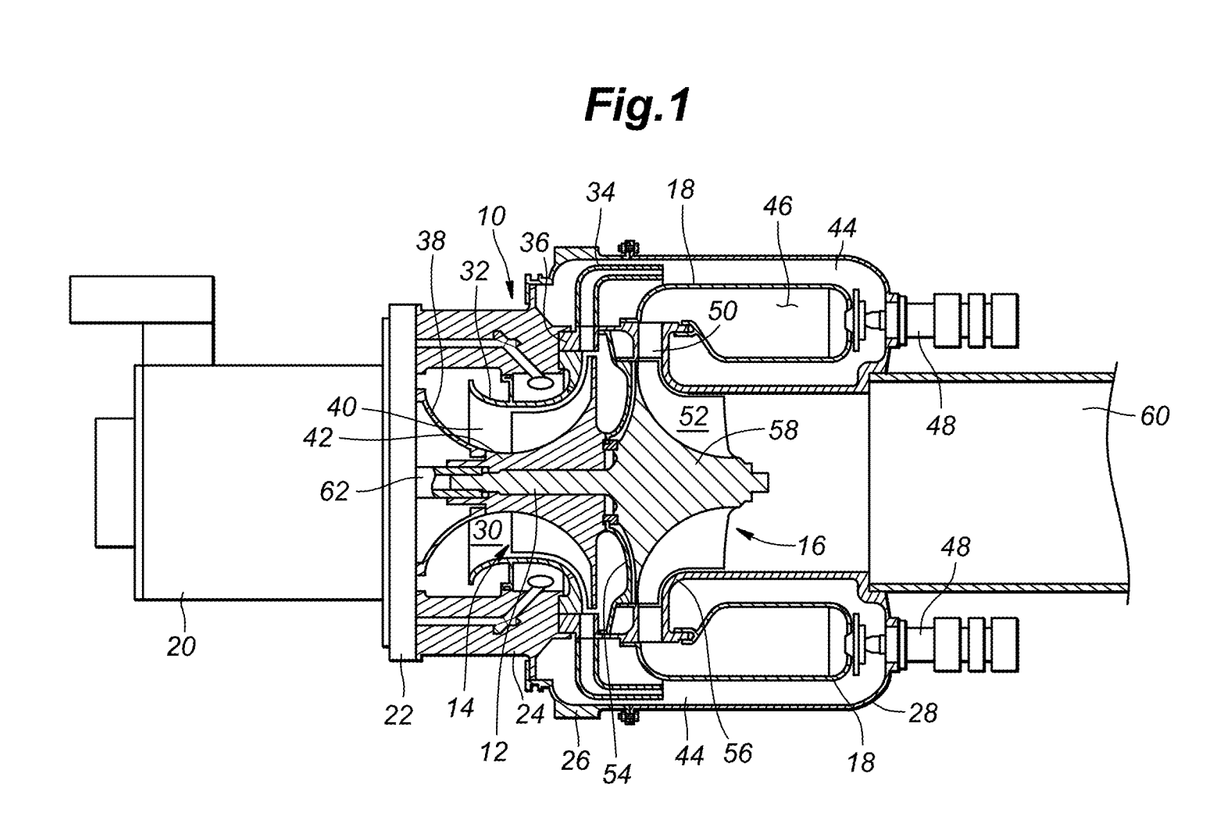
FIG. 1 is a sectional view of a gas turbine system for power generation provided with a radial turbine impeller according to the first embodiment.

A first embodiment of the present invention will be described with reference to FIGS. 1 to 7. FIG. 1 is a sectional view of a gas turbine system 10 for power generation provided with a radial turbine impeller 58 according to the first embodiment. As shown in FIG. 1, the gas turbine system 10 for power generation includes a radial compressor 14 and a radial turbine 16 which are coaxially connected to each other by a rotation shaft 12, combustors 18, and an electric generator 20 connected to the rotation shaft 12.

The gas turbine system 10 for power generation includes a front end plate 22, a front housing 24, an intermediate housing 26, and a rear housing 28 which are connected to each other in the axial direction in order.

The radial compressor 14 includes a compressor housing 32 mounted to the front housing 24 and defining a compressor chamber 30, a diffuser fixing member 36 mounted to the front housing 24 and fixing a diffuser 34, and an air intake guide member 38 mounted to the front end plate 22. The air intake guide member 38 cooperates with the compressor housing 32 to define an air intake 40. In the compressor chamber 30, a compressor impeller 42 mounted on the rotation shaft 12 is rotatably disposed. The compressor impeller 42 is rotationally driven by the rotation shaft 12 which is an output shaft of the radial turbine 16. On the diffuser fixing member 36, the diffuser 34 is mounted.

The radial compressor 14 takes in air (outside air) through the air intake 40, compresses and pressurizes the air by the rotation of the compressor impeller 42, and supplies the compressed and pressurized air (compressed air) to the diffuser 34.

In the rear housing 28, the combustors 18 are provided around the central axis of the rotation shaft 12. The rear housing 28 includes parts that define compressed air passages 44 for guiding the compressed air from the diffuser 34 to the respective combustors 18. Each combustor 18 defines a combustion chamber 46. Each combustor 18 has a fuel injection nozzle 48 mounted thereon. The fuel injection nozzle 48 injects fuel into the combustion chamber 46.

In each combustion chamber 46, the mixture of the fuel injected into the combustion chamber 46 by the fuel injection nozzle 48 and the compressed air from the radial compressor 14 combusts, and a high-pressure combustion gas (compressed fluid) is generated. A turbine nozzle 50 of the radial turbine 16 is provided at gas outlets of the combustors 18.

The radial turbine 16 includes a turbine chamber 52 defined by an inner part of the rear housing 28 and communicating with the gas outlet of each combustor 18. The turbine chamber 52 is separated from the compressor chamber 30 by a partition wall member 54. A side of the turbine chamber 52 opposite from the partition wall member 54 is defined by a shroud 56. In the turbine chamber 52, the radial turbine impeller 58 integrally including the rotation shaft 12 is rotatably disposed.

The turbine nozzle 50 has a circular annular shape so as to surround the radial turbine impeller 58, and ejects the combustion gas radially inward and circumferentially toward the radial turbine impeller 58. The radial turbine impeller 58 is rotationally driven by the combustion gas ejected from the turbine nozzle 50. The combustion gas that has rotationally driven the radial turbine impeller 58 is discharged from an exhaust gas passage 60 to the atmosphere as an exhaust gas.

The rotation shaft 12 is connected to a rotor shaft 62 of the electric generator 20. Thereby, the electric generator 20 is rotationally driven by the rotation shaft 12 of the radial turbine 16 and generates electricity.

Figure 2:
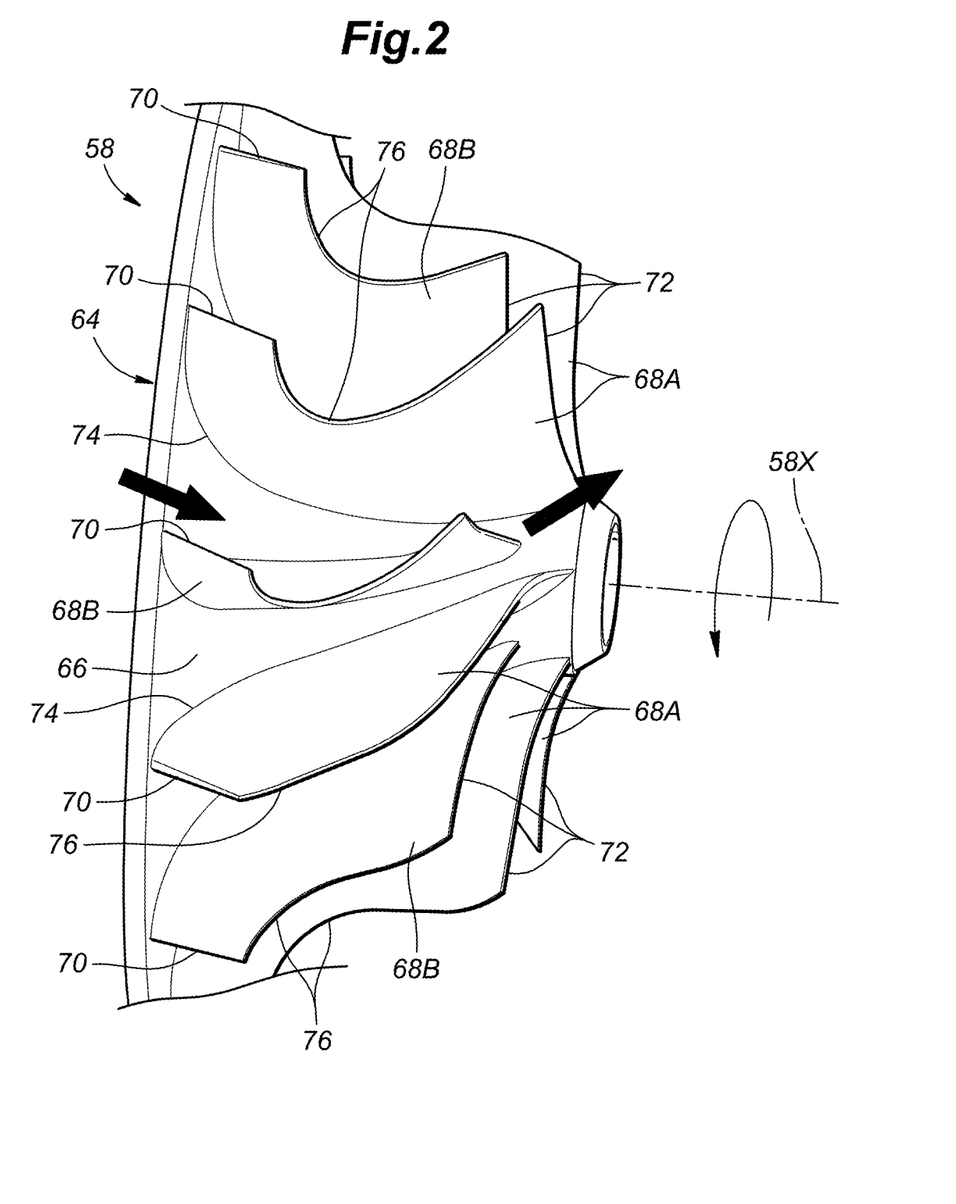
FIG. 2 is an explanatory diagram of the radial turbine impeller.

Next, details of the radial turbine impeller 58 will be described with reference to FIGS. 2 and 3. FIG. 2 is an explanatory diagram of the radial turbine impeller 58. As shown in FIG. 2, the radial turbine impeller 58 includes a hub 64 having a substantially conical shape and multiple turbine blades 68 (68A, 68B) provided on a conical outer peripheral surface 66 of the hub 64 at intervals in the rotational direction. The outer peripheral surface 66 of the hub 64 is rotationally symmetrical about the rotation axis 58X of the radial turbine impeller 58.

The combustion gas jetted from the turbine nozzle 50 toward the radial turbine impeller 58 in a radially inward and circumferential direction flows between mutually adjacent turbine blades 68 as shown by thick black arrows. The side surface of the turbine blade 68 with which the combustion gas collides is a positive pressure surface receiving a positive pressure, and the opposite side surface is a negative pressure surface. As a result of that the positive pressure surface of the turbine blade 68 receives a positive pressure from the combustion gas, the radial turbine impeller 58 rotates in the arrow direction. While flowing between the turbine blades 68, the combustion gas changes its direction from the radial direction to the axial direction along the outer peripheral surface 66 of the hub 64, and is discharged in the axial direction from an outlet that faces in the axial direction.

All of the turbine blades 68 have a leading edge 70 in the same predetermined radially outer position with respect to the radial direction of the radial turbine impeller 58. In the present embodiment, the turbine blades 68 include two types of turbine blades 68 (68A, 68B) having trailing edges 72 in mutually different axial positions with respect to the axial direction of the radial turbine impeller 58. The turbine blades 68 having the trailing edges 72 positioned on a downstream side in the axial direction are full blades 68A (long blades) which have a long blade length, and the turbine blades 68 having the trailing edges 72 positioned upstream of the trailing edges 72 of the full blade 68A are splitter blades 68B (short blades) which have a short blade length. The full blades 68A and the splitter blades 68B are arranged alternately in the circumferential direction. These turbine blades 68 each have a curved shape that is convex in the rotational direction, and are arranged at equal intervals in the circumferential direction. When it is not necessary to distinguish the full blades 68A and the splitter blades 68B from each other, they may be simply referred to as the turbine blades 68.

Figure 3:
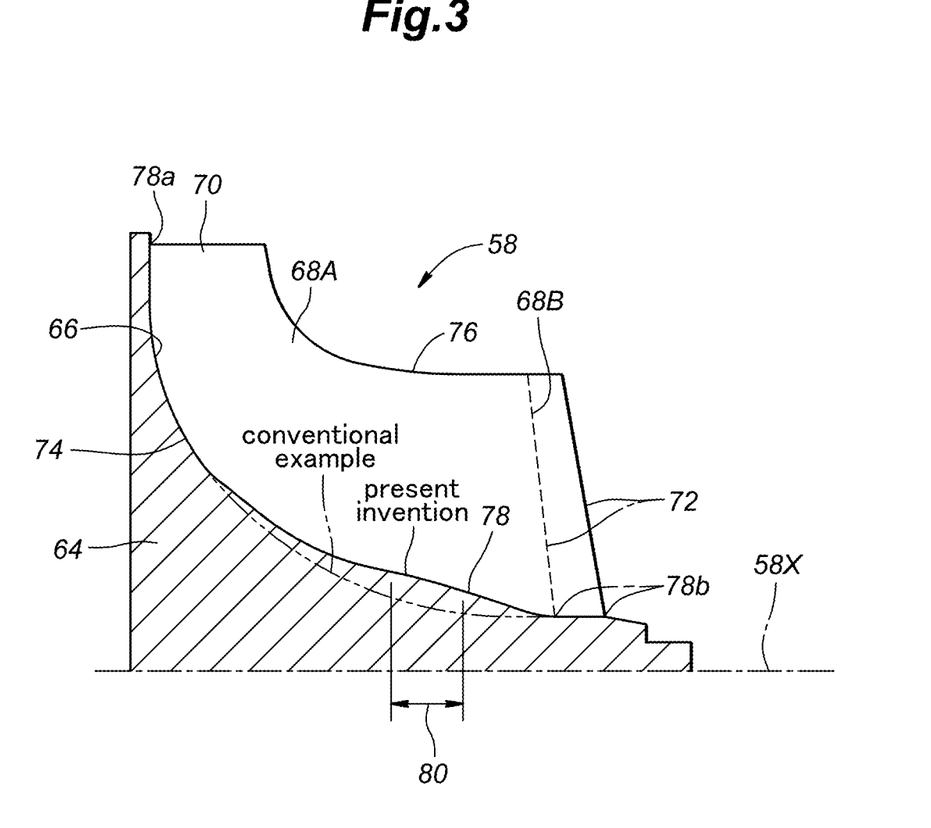
FIG. 3 is a meridian cross-sectional view of the radial turbine impeller.

FIG. 3 is a meridian cross-sectional view of the radial turbine impeller 58. As shown in FIG. 3, in the meridian cross section, the full blades 68A and the splitter blades 68B have a mutually identical height profile which is low at the leading edge 70 and high at the trailing edge 72. Also, each turbine blade 68 is thick on the side of a base end 74 which is joined to the outer peripheral surface 66 of the hub 64 and is thin on the side of a tip 76 which is remote from the outer peripheral surface 66 of the hub 64. The thickness of each turbine blade 68 is progressively thinner toward the upstream side at the leading edge 70 and is progressively thinner toward the downstream side at the trailing edge 72. The tip 76 of each turbine blade 68 opposes the shroud 56 (see FIG. 1) via a predetermined gap.

In this description, a curve formed by the outer peripheral surface 66 of the hub 64 in the meridian cross section of FIG. 3 is called a hub line 78. The outer peripheral surface 66 of the hub 64, namely the hub line 78, has a diameter that monotonically decreases from an upstream end 78a on the radially outer side to a downstream end 78b on the radially inner side. The diameter of the hub line 78 monotonically decreases over the entire section in the axial direction.

On the other hand, the hub line 78 includes a convex part 80 that is convex toward the radially outer side. Thereby, compared to the conventional example shown by the imaginary line in which the hub line 78 does not include the convex part 80, the diameter of the hub line 78 at and near the convex part 80 is increased, and the inter-blade distance at and near the convex part 80 is increased. The convex part 80 will be described in detail after the description of FIG. 4.

Figure 4:
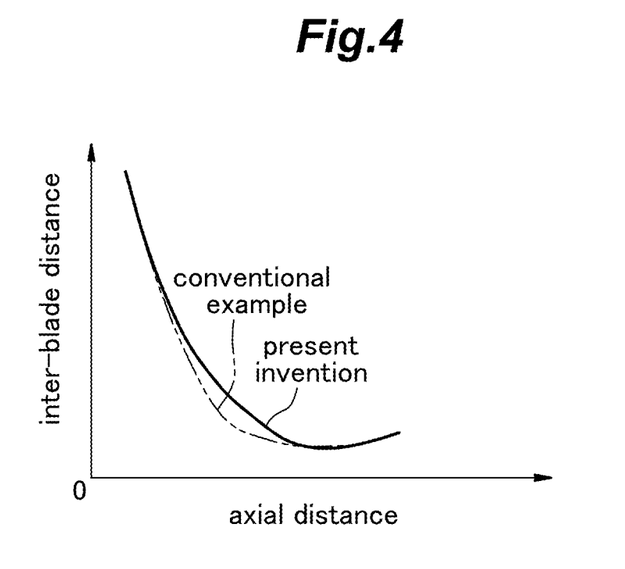
FIG. 4 is a graph showing a correlation between the axial distance and the inter-blade distance of the radial turbine impeller.

FIG. 4 is a graph showing a correlation between the axial distance and the inter-blade distance of the radial turbine impeller 58. The graph uses a Cartesian coordinate system, and the axial distance on the horizontal axis of the graph is the distance along the rotation axis 58X from the upstream end (the left end of FIG. 3) in the axial direction of the radial turbine impeller 58. The inter-blade distance on the vertical axis of the graph is the distance between the base ends 74 of the turbine blades 68 along the outer peripheral surface 66 of the hub 64. As shown in FIG. 4, in the region of the axial distance in which the convex part 80 (FIG. 3) is formed, the inter-blade distance is larger compared to the conventional example shown by the imaginary line in which the hub line 78 does not include the convex part 80. Note that the inter-blade distance slightly increases near the point where the axial distance is the largest. This is a due to the feature that the thickness of the turbine blade 68 is progressively thinner toward downstream side in the trailing edge 72.

Due to the increase in the inter-blade distance at the convex part 80 as described above, it is possible to form fillets with an appropriate radius of curvature, to thereby ensure the support stiffness of the turbine blades 68. Also, in a downstream part of the convex part 80 as well as a part downstream of the convex part 80, an increase in the diameter of the hub line 78 is avoided, and thus, the throat area near the outlet of the radial turbine impeller 58 is not reduced. Therefore, it is possible to increase the number of blades while ensuring the maximum flow rate which depends on the throat area, and to suppress lowering of the efficiency.

Figure 5:
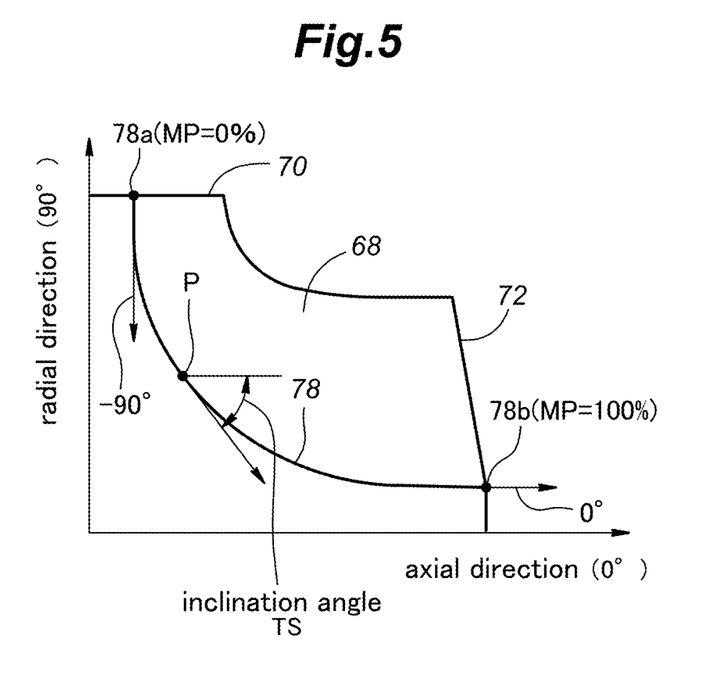
FIG. 5 is an explanatory diagram of a hub shape in a meridian cross section.

Next, the convex part 80 will be described in detail. FIG. 5 is an explanatory diagram of the hub shape in the meridian cross section. The right direction in FIG. 5 is a direction along the axial direction (the direction of the rotation axis 58X (FIG. 3)) toward the downstream side of the radial turbine impeller 58, and the angle of this direction is defined as 0°. The downward direction in FIG. 5 is a direction along the radial direction toward the downstream side of the radial turbine impeller 58 (direction from outside to inside in the radial direction), and the angle of this direction is defined as −90°. The position of a given point P on the hub line 78 is represented as a ratio to the overall length of the hub line 78 from the upstream end 78a of the hub line 78, and this position is referred to as an on-line position PL. The on-line position PL of the upstream end 78a of the hub line 78 is 0%, and the on-line position PL of the downstream end 78b is 100%. The shape of the hub line 78 can be represented by the on-line positions PL of the points P on the hub line 78 and the inclination angle TS of the tangent line at each of these positions.

Figure 6:
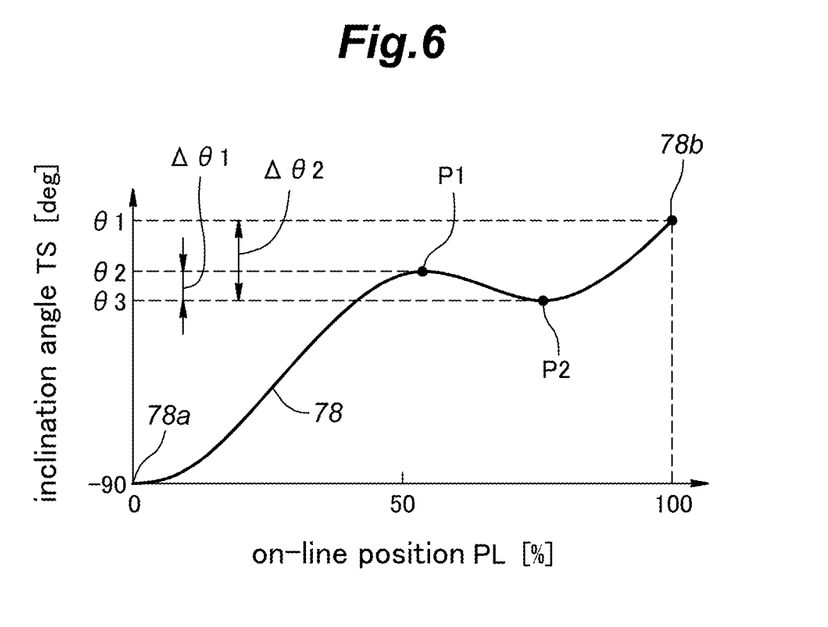
FIG. 6 is a graph showing a correlation between the position on the hub line and the inclination angle of the hub line.

FIG. 6 is a graph showing a correlation between the on-line position PL and the inclination angle TS of the hub line 78, and represents the shape of the hub line 78. As shown in FIG. 6, the graph uses a Cartesian coordinate system, in which the horizontal axis represents the on-line position PL and the vertical axis represents the inclination angle TS of the tangent line. The inclination angle TS of the hub line 78 has the least value at the upstream end 78a (−90° in the illustrated example) and has the greatest value at the downstream end 78b (for example, 0°).

The inclination angle TS of the hub line 78 has a local maximum θ2 and a local minimum θ3 in intermediate positions of the overall length of the hub line 78. Namely, the inclination angle TS of the hub line 78 has two extrema (θ2, θ3). As illustrated, the inclination angle TS has the local maximum θ2 at a local maximum point P1 on the hub line 78 and has the local minimum θ3 at a local minimum point P2 which is located downstream of the local maximum point P1. The local maximum θ2 and the local minimum θ3 are less than the value of the inclination angle TS at the downstream end 78b of the hub line 78 (hereinafter referred to as the downstream end value θ1). The local maximum point P1 (namely, the local maximum θ2) and the local minimum point P2 (namely, the local minimum θ3) are positioned downstream of the upstream end 78a by more than 50% of the overall length of the hub line 78.

In other words, the convex part 80 is positioned downstream of the upstream end 78a by more than 50% of the overall length of the hub line 78. Thereby, in the downstream portion where the diameter of the hub 64 is smaller than in the upstream portion and hence the passage width on the outer peripheral surface 66 of the hub 64 is narrower than in the upstream portion, the narrowing of the passage width can be alleviated. Thus, it is possible to ensure the support stiffness of the turbine blades 68 in the downstream portion while improving the efficiency by increasing the number of blades.

Specifically, if a Cartesian coordinate system is set in the meridian cross section shown in FIG. 3 such that the horizontal axis coincides with the rotation axis 58X and the vertical axis coincides with the left end of the hub 64, the shape of the hub line 78 can be represented as a function on the Cartesian coordinate system. The start position of the convex part 80 is a point where the value of the second derivative of the function becomes negative, and this point is positioned downstream of the upstream end 78a by more than 50% of the overall length of the hub line 78. Thus, with respect to the on-line position PL, the entirety of the convex part 80 is positioned downstream of the upstream end 78a by more than 50% of the overall length of the hub line 78. This can reliably ensure the support stiffness of the turbine blades 68 and improve the efficiency.

In this description, the convex part 80 is defined as a curved part from the point where the value of the second derivative of the function becomes negative to the point where this value becomes 0 as one moves from the upstream end 78a of the hub line 78 toward the downstream end 78b. The end position of the convex part 80 (namely, the point where the value of the second derivative of the function becomes zero from negative) is also positioned downstream of the upstream end 78a by more than 50% of the overall length of the hub line 78.

A first angle difference Δθ1 which is obtained by subtracting the local minimum θ3 of the inclination angle TS from the local maximum θ2 of the inclination angle TS is greater than 0° and less than 25°. In other words, the difference between the inclination angle TS at the start position of the convex part 80 and the inclination angle TS at the end position of the convex part 80 is less than 25°. Thus, the degree of convexity of the convex part 80 is small, and the convex part 80 is prevented from becoming a resistance against the fluid flowing between the turbine blades 68.

Also, a second angle difference Δθ2 which is obtained by subtracting the local minimum θ3 of the inclination angle TS from the downstream end value θ1 of the inclination angle TS is greater than 0° and less than 25°. In other words, the end position of the convex part 80 is located in a radially inner position having an inclination angle TS close to the inclination angle TS at the downstream end 78b. Thus, the diameter of the radially inner part of the hub line 78 where the convex part 80 is provided becomes large, and the inter-blade distance in the radially inner part becomes large.

Figure 7:
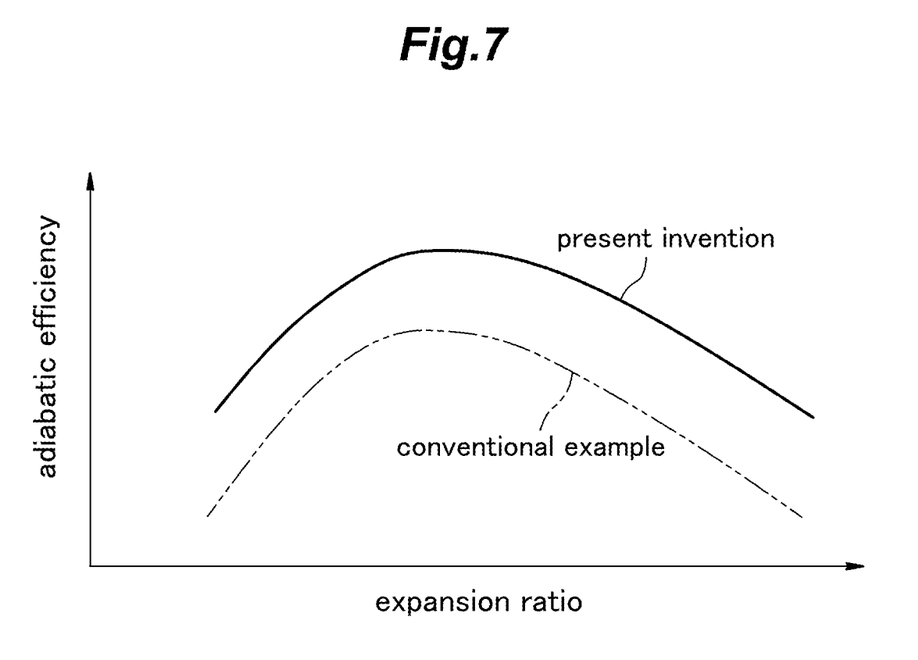
FIG. 7 is a graph showing a correlation between the expansion ratio and the adiabatic efficiency.

FIG. 7 is a graph showing a correlation between the expansion ratio and the adiabatic efficiency. In this graph, the adiabatic efficiency of the radial turbine impeller 58 of the present embodiment is indicated by a solid line, and the adiabatic efficiency of the conventional example in which the hub line 78 does not include the convex part 80 is indicated by an imaginary line. As shown in FIG. 7, In the present embodiment, it is confirmed that compared to the conventional example, the adiabatic efficiency is improved over the whole region of the expansion ratio.

Also, as shown in FIG. 2, the turbine blades 68 include multiple full blades 68A and multiple splitter blades 68B arranged alternately in the circumferential direction, each full blade 68A having the trailing edge 72 in a predetermined position in the axial direction and each splitter blade 68B having the trailing edge 72 in a position closer to the upstream end 78a than the predetermined position is. Thus, since the turbine blades 68 include the splitter blades 68B, the area of the throat formed near the trailing edges of the full blades 68A disposed on either side of each splitter blade 68B in the circumferential direction becomes large. Therefore, it is possible to increase the number of blades while ensuring the maximum flow rate, and to suppress lowering of the efficiency.

Second Embodiment

Next, a second embodiment of the present invention will be described with reference to FIG. 8. Note that in the following, features different from the first embodiment will be described, and the redundant description will be omitted. Also, the elements same as or similar to those of the first embodiment will be denoted by the same reference signs.

Figure 8:
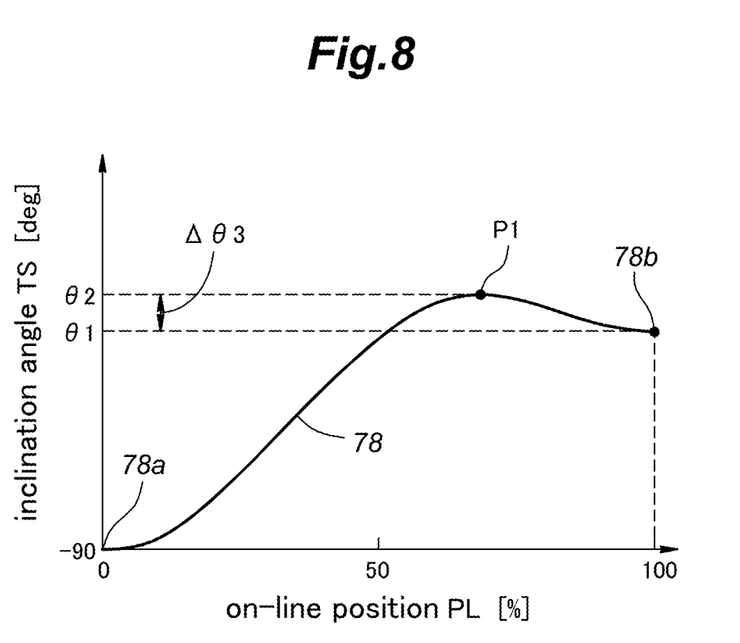
FIG. 8 is a graph showing a correlation between the position on the hub line and the inclination angle of the hub line of a radial turbine impeller according to the second embodiment.

FIG. 8 is a graph showing a correlation between the on-line position PL and the inclination angle TS of the hub line 78, and represents the shape of the hub line 78. As shown in FIG. 8, the graph uses a Cartesian coordinate system, in which the horizontal axis represents the on-line position PL, and the vertical axis represents the inclination angle TS of the tangent line. The inclination angle TS of the hub line 78 has the local maximum $\theta 2$ in an intermediate position of the overall length of the hub line 78 but does not have the local minimum $\theta 3$ (see FIG. 6). Namely, the inclination angle TS of the hub line 78 has only one extremum ($\theta 2$). As illustrated, the inclination angle TS has the local maximum $\theta 2$ at the local maximum point P1 on the hub line 78. The local maximum $\theta 2$ is greater than the downstream end value $\theta 1$. The local maximum point P1 (namely, the local maximum $\theta 2$) is positioned downstream of the upstream end 78a by more than 50% of the overall length of the hub line 78.

In other words, the convex part 80 is positioned downstream of the upstream end 78a by more than 50% of the overall length of the hub line 78. Thereby, in the downstream portion where the diameter of the hub 64 is smaller than in the upstream portion and hence the passage width on the outer peripheral surface 66 of the hub 64 is narrower than in the upstream portion, the narrowing of the passage width is alleviated. Thus, it is possible to ensure the support stiffness of each turbine blade 68 in the downstream portion while improving the efficiency by increasing the number of blades.

Specifically, in the meridian cross section shown in FIG. 3, the start position of the convex part 80 (namely, the point where the value of the second derivative of the function becomes negative in the Cartesian coordinate system of FIG. 5) is positioned downstream of the upstream end 78a by more than 50% of the overall length of the hub line 78. Thus, with respect to the on-line position PL, the entirety of the convex part 80 is positioned downstream of the upstream end 78a by more than 50% of the overall length of the hub line 78. This can reliably ensure the support stiffness of the turbine blade 68 and improve the efficiency.

A third angle difference $\Delta\theta 3$ obtained by subtracting the downstream end value $\theta 1$ (the value of the inclination angle TS at the downstream end 78b of the hub line 78) from the local maximum $\theta 2$ (the value of the inclination angle TS at the local maximum point P1) is greater than 0° and less than 25°. In other words, the start position of the convex part 80 is located in a radially inner position having an inclination angle TS close to the inclination angle TS at the downstream end 78b of the hub line 78. Thus, the diameter of the radially inner part of the hub line 78 where the convex part 80 is provided becomes large, and the inter-blade distance in the radially inner part becomes large.

Concrete embodiments of the present invention have been described in the foregoing, but the present invention is not limited to the above embodiments and may be modified or altered in various ways. For example, in the above embodiment, the turbine blades 68 include the full blades 68A, which are long blades, and the splitter blades 68B, which are short blades, the turbine blades 68 may be composed of only the full blades 68A. Also, not all of the components shown in the above embodiments are necessarily indispensable and they may be selectively adopted as appropriate.

The invention claimed is:

1. A radial turbine impeller comprising a hub having a substantially conical shape and multiple turbine blades provided on an outer peripheral surface of the hub at intervals in a rotational direction, wherein in a meridian cross section, a hub line formed by the outer peripheral surface of the hub has a diameter that monotonically decreases from an upstream end on a radially outer side to a downstream end on a radially inner side, and includes a convex part that is convex toward a radially outer side, a position of the convex part on the hub line in the meridian cross section is located downstream of the upstream end by more than 50% of an entire length of the hub line, provided that in the meridian cross section, a direction directed toward the downstream end in an axial direction of the radial turbine impeller is represented as 0°, and a radial direction of the hub directed from the upstream end toward an inner side is represented as −90°, an inclination angle of a tangent line of the hub line has at least one extremum on a side downstream of the upstream end by more than 50% of the entire length of the hub line, the at least one extremum consists of one local maximum and one local minimum, and an angle difference obtained by subtracting the local minimum of the inclination angle from the local maximum of the inclination angle is greater than 0° and less than 25°.

2. The radial turbine impeller according to claim 1, wherein an angle difference obtained by subtracting the local minimum of the inclination angle from the inclination angle at the downstream end is greater than 0° and less than 25°.

3. A radial turbine impeller comprising a hub having a substantially conical shape and multiple turbine blades provided on an outer peripheral surface of the hub at intervals in a rotational direction, wherein in a meridian cross section, a hub line formed by the outer peripheral surface of the hub has a diameter that monotonically decreases from an upstream end on a radially outer side to a downstream end on a radially inner side, and includes a convex part that is convex toward a radially outer side, a position of the convex part on the hub line in the meridian cross section is located downstream of the upstream end by more than 50% of an entire length of the hub line, provided that in the meridian cross section, a direction directed toward the downstream end in an axial direction of the radial turbine impeller is represented as 0°, and a radial direction of the hub directed from the upstream end toward an inner side is represented as −90°, an inclination angle of a tangent line of the hub line has at least one extremum on a side downstream of the upstream end by more than 50% of the entire length of the hub line, the at least one extremum consists of one local maximum, and an angle difference obtained by subtracting the inclination angle at the downstream end from the local maximum of the inclination angle is greater than 0° and less than 25°.

4. The radial turbine impeller according to claim 1, wherein the turbine blades include multiple long blades and multiple short blades disposed alternately in a circumferential direction, each long blade having a trailing edge in a predetermined position in an axial direction of the radial turbine impeller, and each short blade having a trailing edge positioned upstream of the predetermined position.

5. The radial turbine impeller according to claim 3, wherein the turbine blades include multiple long blades and multiple short blades disposed alternately in a circumferential direction, each long blade having a trailing edge in a predetermined position in an axial direction of the radial turbine impeller, and each short blade having a trailing edge positioned upstream of the predetermined position.

\* \* \* \* \*